March 13, 1934.  O. E. BEERS  1,951,267
TROMBONE
Filed Sept. 30, 1932   2 Sheets-Sheet 2
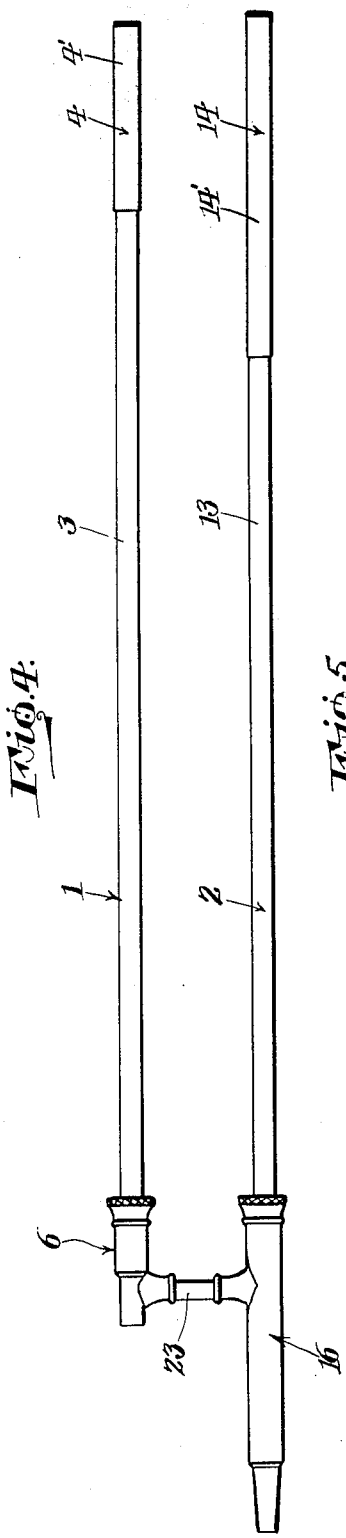
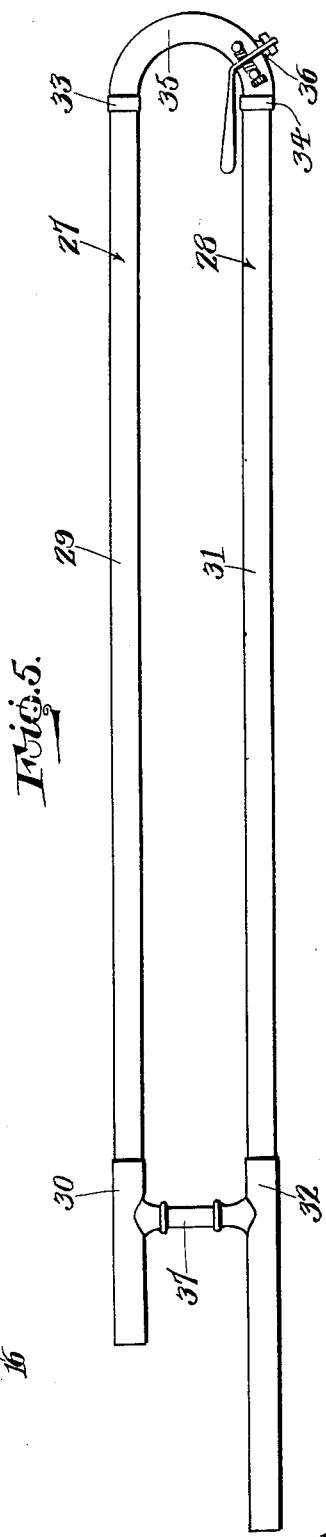
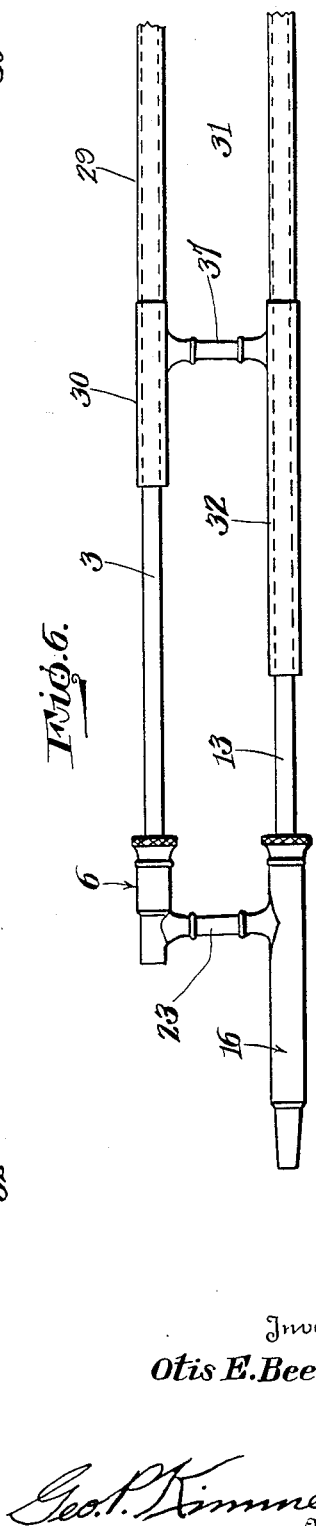
Inventor
Otis E. Beers
Geo. P. Kimmel
Attorney Patented Mar. 13, 1934

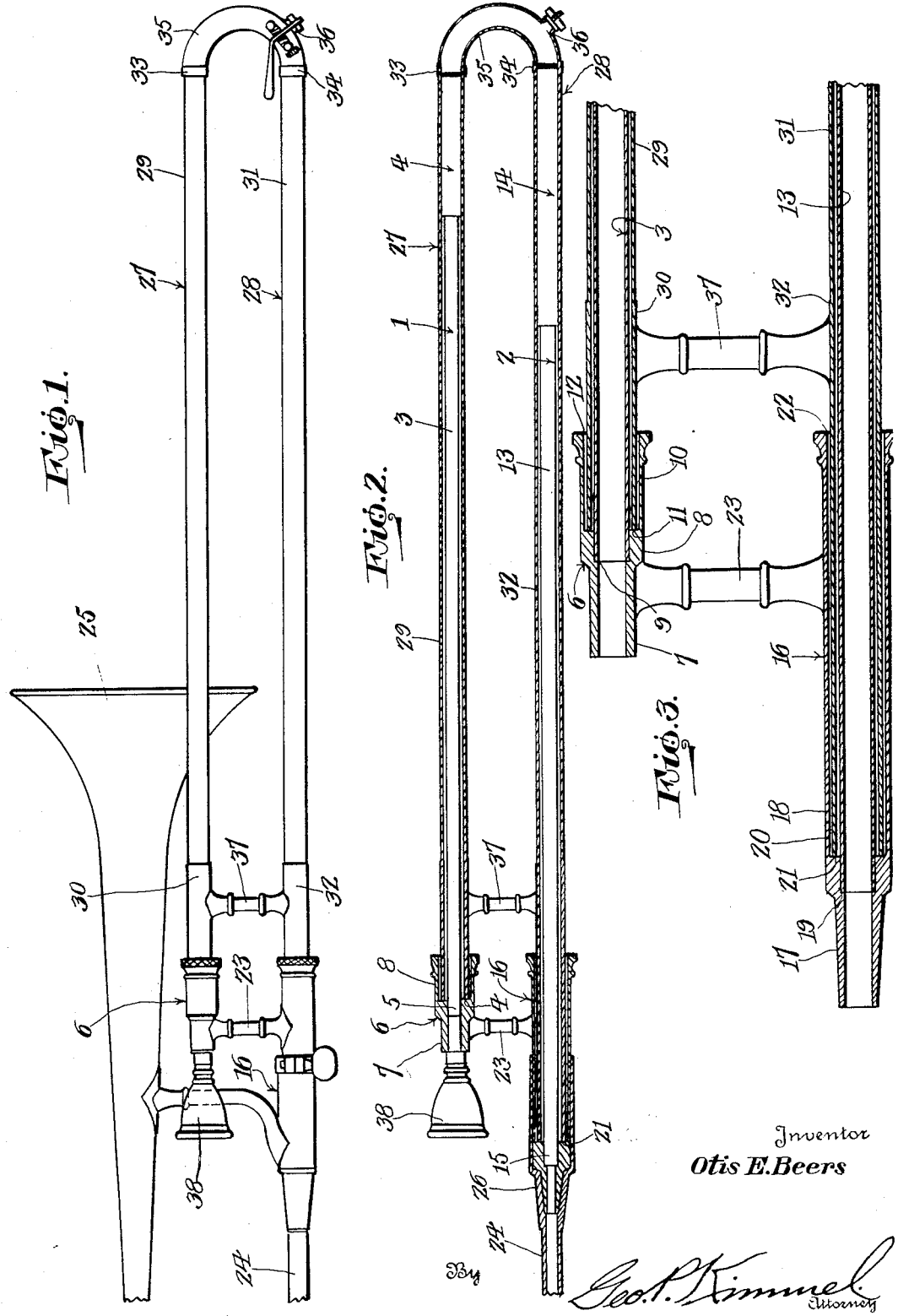

1,951,267

UNITED STATES PATENT OFFICE 1,951,267

TROMBONE

Otis E. Beers, Elkhart, Ind., assignor to Buescher Band Instrument Co., a corporation of Indiana Application September 30, 1932, Serial No. 635,696

11 Claims. (Cl. 84—395)

This invention relates to musical instruments more especially to a trombone and has for its object to provide in a manner as hereinafter set forth, a trombone so constructed and arranged to prevent the binding of the outside slides with respect to the inside slides of the instrument when they are shifted relatively to each other.

A further object of the invention is to provide, in a manner as hereinafter set forth the inside slides of a trombone with bearings of different lengths for the outside slides of the instrument to prevent the binding of the outside slides relative to the inside slides when the outside slides are shifted relatively to the inside slides.

A further object of the invention is to provide, in a manner as hereinafter set forth the inside slides of a trombone with bearings for the outside slides of the instrument to prevent the sagging of the outside slides relative to the inside slides to eliminate binding when the outside slides are shifted relatively to the inside slides, especially when the outside slides have been shifted to their extreme extended position with respect to the inside slides.

A further object of the invention is to provide the upper and lower inside slides of a trombone with bearing surfaces for the upper and lower outside slides respectively of the instrument. The bearing on the lower inside slide being of greater length than that of the bearing on the upper inside slide and with such bearings coacting to prevent sagging thereby eliminating the binding of the outside slides relative to the inside slides when the former are shifted relatively to the latter.

A further object of the invention is to provide, in a manner as hereinafter set forth, a trombone having the upper and lower inside slides thereof of unequal length, the upper and lower outside slides of unequal length, the upper and lower inside slides each provided with a bearing, the bearing on the upper inside slide being of less length than that on the lower inside slide, an over-part forming a portion of each outside slide, the over-part of the upper outside slide being of less length than the over-part of the lower outside slide, said bearings and over-parts coacting to eliminate the sagging of the outside slides with respect to the inside slides to eliminate binding when the outside slides are shifted relative to the inside slides or vice versa.

To the above ends essentially and to others which may hereinafter appear, the invention consists of such parts, and such combination of parts which fall within the scope of the invention as claimed.

In the drawings:—

Figure 1 is a side elevation, broken away at one end of the trombone.

Figure 2 is a fragmentary view in longitudinal section of the trombone.

Figure 3 is a fragmentary view, upon an enlarged scale, in longitudinal section of the trombone.

Figure 4 is a side elevation of the inside slides.

Figure 5 is a side elevation of the outside slides.

Figure 6 is a fragmentary view in side elevation of the inside and outside slides shifted relatively to each other.

Referring to the drawings, the upper and lower inside slides are indicated generally at 1, 2 respectively. The upper inside slide 1 comprises a tube 3 having the outer end terminal portion 4 thereof of greater outer diameter than the remaining portion of the tube and which is provided by a stocking 4'. The end terminal portion 4 provides an elongated bearing for the upper slide of the outside slides to be referred to. The other end terminal portion 5 of the tube 3 is anchored in a receiver 6, the latter including a cylindrical rear part 7 and an outer cylindrical part 8 offset with respect to said rear part. The inner diameter of part 7 is less than that of part 8 thereby providing the inner face of receiver 6, 8 intermediate the ends thereof with a shoulder 9 against which abuts the inner end edge of tube 3. The width of shoulder 9 corresponds to the thickness of the body of tube 3. The inner diameter of part 7 corresponds to the inner diameter of tube 3 whereby the inner face of the latter will form a flush continuation of the inner face of the former when the tube 3 is in abutting position with respect to shoulder 9. The inner face of part 8 is rabbeted, as at 10 to provide an annular shoulder 11 which constitutes a stop for a purpose to be referred to. The rabbeting of the inner face of part 8 provides for the latter to have a pair of portions of two different inner diameters and that portion of smallest inner diameter encompasses and has anchored thereto the terminal portion 5 of tube 3. The inner diameter of the terminal portion 5 is the same as the inner diameter of the part 7 of receiver 6. The tube 3 extends outwardly from part 8 and has its outer face spaced from the inner face of the latter to form a clearance 12. That part of the tube 3 arranged in receiver 6 is of less length than the length of terminal portion 4. The part 7 of receiver 6 is of less length than the length of part 8.

The lower inside slide 2 comprises a tube 13 of greater length than tube 3 and has its inner end extending beyond the inner end of tube 3. The latter has the outer end terminal portion 14 thereof of greater outer diameter than its remaining portion and which is provided by a stocking 14'. The end terminal portion 14 provides an elongated bearing for the lower slide of the outside slides to be referred to. The bearing formed by end terminal portion 14 is of greater length than the bearing provided by the end terminal portion 4. The bearing on tube 13 projects inwardly beyond the inner end and outwardly beyond the outer end of the bearing on tube 3. The other end terminal portion 15 of tube 13 is anchored in a receiver 16 of greater length than receiver 6. The receiver 16 includes a cylindrical rear part 17 and an outer cylindrical part 18 offset with respect to part 18. The inner diameter of part 17 is less than that of part 18 thereby providing the inner face of receiver 16, intermediate its ends with a shoulder 19 against which abuts the inner end edge of tube 13. The width of shoulder 19 corresponds to the thickness of the body of the tube 13. The inner diameter of part 17 corresponds to the inner diameter of tube 13 whereby the inner face of the latter will form a flush continuation of the inner face of the former when the tube 13 is in abutting position with respect to shoulder 19. The inner face of part 18 is rabbeted as at 20 to provide an annular shoulder 21 which constitutes a stop for a purpose to be referred to. The rabbeting of the inner face of part 18 provides for the latter to have a pair of portions of two different inner diameters and that portion of smallest inner diameter encompasses and has anchored thereto the outer terminal portion 15 of tube 13. The inner diameter of terminal portion 15 is the same as the inner diameter of part 17 of receiver 16. The tube 13 extends outwardly from part 18 and has its outer face spaced from the inner face of the latter to provide a clearance 22. That part of the tube 13 arranged in the receiver 16 is of less length than the length of terminal portion 14. The part 17 of receiver 16 is of less length than part 18. The parts 17, 18 are of greater length than the parts 7, 8 respectively.

The part 7 of receiver 6 is connected to part 18 of receiver 16 by a rigid bridge piece or brace 23. The tube 24 which leads to the bell 25 is coupled to receiver 16 as at 26.

The upper and lower outside slides are indicated at 27, 28 respectively. The upper outside slide comprises a tube 29 terminating at its inner end into a cylindrical over-part or ferrule 30 having its outer diameter greater than that of the outer diameter of the tube. The lower outside slide comprises a tube 31 terminating at its inner end into a cylindrical over-part or ferrule 32 having its outer diameter greater than that of the outer diameter of the tube. The over-part 32 is of greater length than the over-part 30. The over-parts 30, 32 slide in the clearances 12, 22 respectively. The tubes 29, 31 are slidably mounted on the tubes 3, 13 respectively. The slide 27 is of materially less length than that of slides 28 and said slides have their inward movement arrested by the stops 11, 21 respectively.

The outer ends of the tubes 29, 31 are connected as at 33, 34 respectively to the ends of a curved tube 35 having a valve controlled moisture outlet 36. The over-parts 30, 32 in proximity to their points of joinder with the tubes 29, 31 respectively are connected together by a rigid bridge piece or brace 37 which constitutes a handle member. A mouth piece 38 is connected to the part 7 of receiver 6.

Preferably the length of the bearing provided by the terminal portion 4 will be the same as that of over-part 30. Preferably the length of the bearing provided by the terminal portion 14 will be the same as that of over-part 32. The bearings provide the inside slides lengthwise with stretches at their outer ends of greater outer diameter than the remaining portions of such slides. The over-parts 30, 32 provide the outside slides lengthwise with stretches at their inner ends of greater outer diameter than the remaining portions of the outer slides. The stretches of greater outer diameter of the inside slides extend rearwardly from the outer terminii of said inside slides. The stretches of greater outer diameter of the outside slides extend outwardly from the inner terminii of the outside slides. The bearings are to be of unequal length and coact with the inner faces of the slides 27, 28, the unequaled length over-parts and the unequaled length receivers to prevent the sagging of the outside slides when extended thereby eliminating binding between the inside and outside slides.

The end terminal portions 4 and 14 which provide the bearings are made of unequal length in order to minimize any chance of the slides binding when in the extended position, as it has been found that by forming the bearing provided by the terminal portion 14 of greater length than the bearing provided by the terminal portion 4 the slides are held in alignment in a manner to prevent the inside slides from binding against the outside slides when in the extended position.

What I claim is:—

1. In a trombone, upper and lower inside slides, upper and lower outside slides mounted upon the inside slides, each of said inside slides having a stretch of the length thereof extended rearwardly from the outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extended rearwardly beyond the inner end of the stretch of greater outer diameter of said upper inside slide.

2. In a trombone, upper and lower inside slides, upper and lower outside slides mounted upon the inside slides, each of said inside slides having a stretch of the length thereof extended rearwardly from its outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extending rearwardly beyond the inner end and outwardly beyond the outer end of the stretch of greater outer diameter of said upper inside slide.

3. In a trombone, upper and lower inside slides, upper and lower outside slides mounted upon the inside slides, each of said inside slides having a stretch of the length thereof extended rearwardly from the outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extended rearwardly beyond the inner end of the stretch of greater outer diameter of said upper inside slide, each of said outside slides having a stretch of the length thereof extending outwardly from its inner terminus of greater outer diameter throughout than that part thereof extended outwardly from the outer end of the stretch thereof, said stretches of the outside slides being arranged directly opposite each other and providing the inner terminal portions of the outside slides with an enlarged over-part.

4. In a trombone, upper and lower inside slides, upper and lower outside slides mounted upon the inside slides, each of said inside slides having a stretch of the length thereof extended rearwardly from its outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extending rearwardly beyond the inner end and outwardly beyond the outer end of the stretch of greater outer diameter of said upper inside slide, each of said outside slides having a stretch of the length thereof extending outwardly from its inner terminus of greater outer diameter throughout than that part thereof extended outwardly from the outer end of the stretch thereof, said stretches of the outside slides being arranged directly opposite each other and providing the inner terminal portions of the outside slides with an elongated over-part.

5. In a trombone, upper and lower inside slides, upper and lower outside slides mounted upon the inside slides, each of said inside slides having a stretch of the length thereof extended rearwardly from the outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extended rearwardly beyond the inner end of the stretch of greater outer diameter of said upper inside slide, each of said outside slides having a stretch of the length thereof extending outwardly from its inner terminus of greater outer diameter throughout than that part thereof extended outwardly from the outer end of the stretch thereof, said stretches of the outside slides being arranged directly opposite each other and providing the inner terminal portions of the outside slides with an enlarged over-part, the stretch of greater outer diameter of the lower outside slide being of greater length than and extending rearwardly beyond the inner end of the stretch of greater outer diameter of said upper outside slide.

6. In a trombone, upper and lower inside slides, upper and lower outside slides mounted upon the inside slides, each of said inside slides having a stretch of the length thereof extended rearwardly from its outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extending rearwardly beyond the inner end and outwardly beyond the outer end of the stretch of greater outer diameter of said upper inside slide, each of said outside slides having a stretch of the length thereof extending outwardly from its inner terminus of greater outer diameter throughout than that part thereof extended outwardly from the outer end of the stretch thereof, said stretches of the outside slides being arranged directly opposite each other and providing the inner terminal portions of the outside slides with an elongated over-part, the stretch of greater outer diameter of the lower outside slide being of greater length than and extending rearwardly beyond the inner end of the stretch of greater outer diameter of said upper outside slide.

7. In a trombone, upper and lower inside slides, upper and lower outside slides mounted upon the inside slides, each of said inside slides having a stretch of the length thereof extended rearwardly from the outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extended rearwardly beyond the inner end of the stretch of greater outer diameter of said upper inside slide, an upper and a lower tubular receiver, the latter being of greater length than and extending rearwardly beyond the inner end of the former, each of said receivers having portions of different inner diameters to provide a pair of spaced internal shoulders intermediate its ends and with one shoulder arranged rearwardly with respect to the other, the shoulders of the lower receiver being disposed rearwardly with respect to the shoulders in the other receiver, means for securing said receivers together in fixed spaced relation, and said upper and lower inside slides having their rear ends abutting respectively the rear shoulders of said upper and lower receivers.

8. In a trombone, upper and lower inside slides, upper and lower outside slides mounted upon the inside slides, each of said inside slides having a stretch of the length thereof extended rearwardly from its outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extending rearwardly beyond the inner end and outwardly beyond the outer end of the stretch of greater outer diameter of said upper inside slide, an upper and a lower tubular receiver, the latter being of greater length than and extending rearwardly beyond the inner end of the former, each of said receivers having portions of different inner diameters to provide a pair of spaced internal shoulders intermediate its ends and with one shoulder arranged rearwardly with respect to the other, the shoulders of the lower receiver being disposed rearwardly with respect to the shoulders in the other receiver, means for securing said receivers together in fixed spaced relation, and said upper and lower inside slides having their rear ends abutting respectively the rear shoulders of said upper and lower receivers.

9. In a trombone, upper and lower inside slides, upper and lower outside slides mounted upon the inside slides, each of said inside slides having a stretch of the length thereof extended rearwardly from the outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extended rearwardly beyond the inner end of the stretch of greater outer diameter of said upper inside slide, an upper and a lower tubular receiver, the latter being of greater length than and extended rearwardly beyond the inner end of the former, each of said receivers having portions of different inner diameters to provide a pair of spaced internal shoulders intermediate its ends and with one shoulder arranged rearwardly with respect to the other, the shoulders of the lower receiver being disposed rearwardly with respect to the shoulders in the other receiver, means for securing said receivers together in fixed spaced relation, said upper and lower inside slides having their rear ends abutting respectively the rear shoulders of said upper and lower receivers, and the rear ends of the over-parts of said upper and lower outside slides for abutting respectively the forward shoulders of said upper and lower receivers.

10. In a trombone, upper and lower inside slides, upper and lower outside slides mounted upon the inside slides, each of said inside slides having a stretch of the length thereof extended rearwardly from its outer terminus of greater outer diameter throughout than that part thereof extended rearwardly from the inner end of said stretch, said stretches being arranged directly opposite each other and providing elongated bearings for said outside slides, the stretch of greater outer diameter of said lower inside slide being of greater length than and extending rearwardly beyond the inner end and outwardly beyond the outer end of the stretch of greater outer diameter of said upper inside slide, an upper and a lower tubular receiver, the latter being of greater length than and extending rearwardly beyond the inner end of the former, each of said receivers having portions of different inner diameters to provide a pair of spaced internal shoulders intermediate its ends and with one shoulder arranged rearwardly with respect to the other, the shoulders of the lower receiver being disposed rearwardly with respect to the shoulders in the other receiver, means for securing said receivers together in fixed spaced relation, said upper and lower inside slides having their rear ends abutting respectively the rear shoulders of said upper and lower receivers, and the rear ends of the over-parts of said upper and lower outside slides for abutting respectively the forward shoulders of said upper and lower receivers.

11. A trombone comprising upper and lower tubular receivers, the latter being of greater length than the former and extending rearwardly therefrom, upper and lower inside slides, the latter being of greater length than the former and extending rearwardly therefrom, said slides being provided with outer end terminal portions of enlarged outer diameter to form elongated bearings arranged directly opposite each other, the bearing on the lower slide being of greater length than and extending rearwardly from the inner end of the bearing on the upper slide, said upper and lower slides extending into and having their ends fixedly secured in the upper and lower receivers respectively, the inner end of the upper slide being disposed outwardly with respect to the inner end of the lower slide, and upper and lower outer slides, the latter being of greater length than the former and extending rearwardly therefrom, said outside slides being mounted upon said inside slides and having their inner end portions of enlarged outer diameter to provide over-parts for extension into said receivers, the over-part of the lower outside slide being of greater length than and extending rearwardly from the inner end of the over-part of the upper outside slide.

OTIS E. BEERS.